(12) United States Patent
Ai

(10) Patent No.: US 11,622,192 B1
(45) Date of Patent: Apr. 4, 2023

(54) SYSTEMS AND METHODS FOR PROVIDING IN-GROOVE BEAMFORMING MICROPHONES

(71) Applicant: META PLATFORMS TECHNOLOGIES, LLC, Menlo Park, CA (US)

(72) Inventor: Jiang Ai, Issaquah, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/667,443

(22) Filed: Feb. 8, 2022

Related U.S. Application Data

(60) Provisional application No. 63/216,458, filed on Jun. 29, 2021.

(51) Int. Cl.
*H04R 3/00* (2006.01)
*H04R 1/40* (2006.01)
*H04R 31/00* (2006.01)
*G02B 27/01* (2006.01)
*H04R 1/00* (2006.01)

(52) U.S. Cl.
CPC ......... *H04R 1/406* (2013.01); *G02B 27/0176* (2013.01); *H04R 31/00* (2013.01); *H04R 2499/15* (2013.01)

(58) Field of Classification Search
CPC .... H04R 1/406; H04R 31/00; H04R 2499/15; G02B 27/0176
USPC ...................................................... 381/92, 333
See application file for complete search history.

(56) References Cited

U.S. PATENT DOCUMENTS

2019/0068529 A1*  2/2019  Mullins ................ H04N 13/332

* cited by examiner

*Primary Examiner* — Ammar T Hamid
(74) *Attorney, Agent, or Firm* — Greenberg Traurig, LLP

(57) ABSTRACT

The disclosed device may include an optical structure configured to house various sensors directed toward a user. The sensors may be configured to gather data through at least one layer of the optical structure. The device may also a vent bracket positioned between the optical structure and an outer covering of the device. The vent bracket may be positioned to provide an opening between the optical structure and the vent bracket, allowing air to flow through the opening. The device may also include various microphones positioned in recessed ports between the optical structure and the vent bracket. These openings may allow external sounds to reach the microphones in the device. Various other methods of manufacturing, systems, and computer-readable media are also disclosed.

20 Claims, 16 Drawing Sheets

SYSTEMS AND METHODS FOR PROVIDING IN-GROOVE BEAMFORMING MICROPHONES

CROSS REFERENCE TO RELATED APPLICATION

This application claims priority to and the benefit of U.S. Provisional Application No. 63/216,458, filed Jun. 29, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
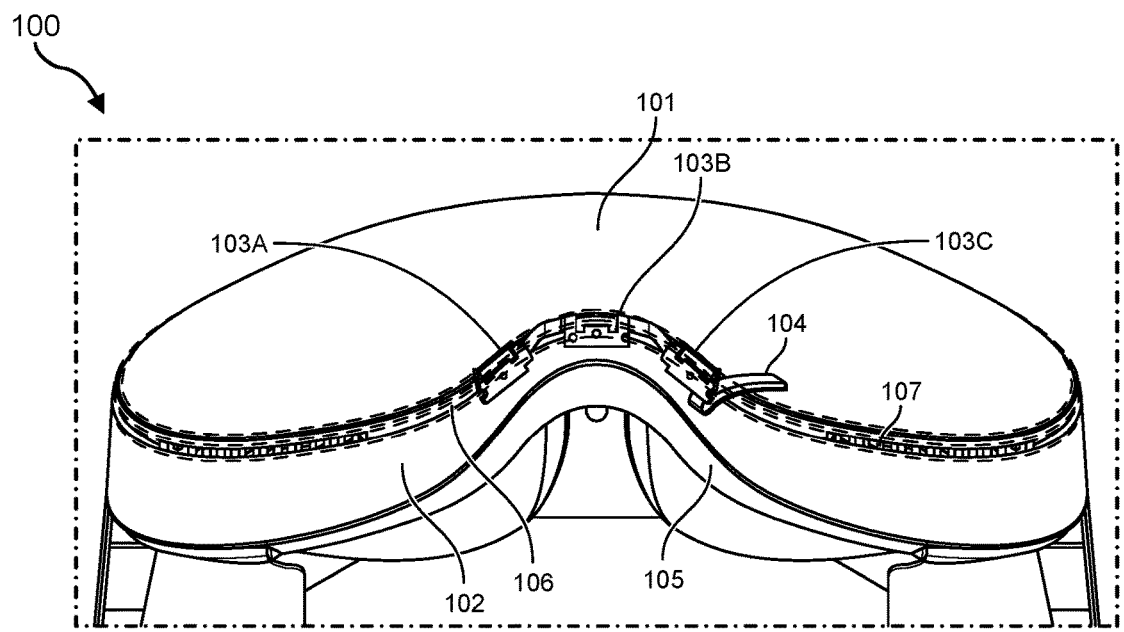
FIG. 1 illustrates an example embodiment of a head mounted display that includes an array of microphones embedded in a groove.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

This application is generally directed to systems and methods that provide recessed audio ports within the grooves of an electronic device. In some cases, these grooves may be part of active cooling systems that are used in artificial reality devices. Indeed, the embodiments described herein may operate or be implemented in many different types of electronic devices including, for example, head-mounted artificial reality devices. In some artificial reality devices (e.g., virtual reality devices or augmented reality devices, etc.), audio ports that allow external access to microphones may be drilled into optical elements that are designed to sit on a user's nose. These optical elements are generally transparent and may allow sensors placed behind the optical elements to track movements of the user's mouth, nose, face, and body.

Having holes drilled into these optical elements, however, for the purpose of porting audio waves into a microphone may limit the number of locations where face tracking sensors can be placed. Still further, in these artificial reality devices, the holes for the audio ports may be positioned in locations that are on or near portions of the user's nose. As such, these types of audio ports may be occluded by the user's nose. This occlusion may distort the audio waves that travel through those ports. Still further, some artificial reality devices' placement of audio ports may also make testing more difficult. At least in some cases, each audio port drilled into the optical element may be accompanied by a slit in the outermost covering of the artificial reality device. This slit may be difficult to fully plug during testing and, as such, audio waves may leak out of the slit. This, in turn, may lead to subpar audio testing results.

At least some of the embodiments described herein may allow microphone (or potentially speaker) audio ports to be placed in locations that are farther away from the user's nose. This may allow external sounds to reach the microphones (or travel outward from the speakers) free of occlusion. Moreover, this placement of microphone ports away from the user's nose may allow the optical element to be formed in a single, solid piece, without any holes drilled into it, or without any limits on where face tracking sensors can be placed within the artificial reality device. Indeed, the embodiments described herein may implement recessed audio ports that are less likely to occlude audio regardless of where the optical element is placed relative to the user's nose. In some cases, these recessed audio ports may be included in a groove of the artificial reality device that is otherwise configured to guide or channel air flow for cooling. The groove may be fully sealed during testing and, as such, each microphone or speaker may be tested more accurately for sound leakage. As such, the embodiments described herein may provide for improved microphone (or speaker) functionality in electronic devices, including artificial reality devices. This improved functionality may provide a variety of benefits, including less sound occlusion, greater freedom in placement of face tracking sensors, and better sound leakage testing.

In some embodiments, the systems herein may also include sealing foam that is strategically placed between the microphone(s) and the optical element, through which the face tracking sensors operate. By placing sealing foam between the microphones and the optical element, the systems herein may conduct sound leakage tests with greater efficiency. In some devices, as noted above, holes may be drilled into the optical element to provide ports for external audio to reach the individual microphones. In the embodiments described herein, microphone testing methods may be provided that may yield highly consistent results, while remaining resistant to background noise. These testing methods may include involve a transducer for a stimulus source, as well as a reference microphone. The reference microphone may be placed in a recessed microphone port of the artificial reality device under test. Because of the recessed nature of the microphone port, and based on the positioning of the reference microphone between the optical element and the outer covering of the device, the microphone may be fully sealed using the sealing foam positioned between the microphones and the optical element. This may provide much more realistic and accurate sound leakage test results that may better carry over into real-world, production devices. These embodiments will be described in greater detail below with regard to FIGS. 1-16B of the drawings.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an embodiment of an example head-mounted display (HMD) 100. The HMD 100 may be substantially any type of artificial reality device including a virtual reality device, an augmented reality device, or other type of electronic device. The HMD 100 may include multiple different electronic components including microphones 103A, 103B, and 103C. While three microphones are illustrated in FIG. 1, it will be understood that the HMD 100 may include substantially any number of microphones. In some cases, these microphones 103A-103C may be beamforming microphones. As such, the microphones 103A-103C may be physically and/or electronically steered to a particular location. In some cases, for instance, the microphones 103A-103C may be physically or electronically steered toward a user's mouth while that user is wearing the HMD 100. When the microphones 103A-103C are steered toward the user's mouth, they may be more capable of detecting the user's words. It should also be understood that these microphones 103A-103C may, at least in some cases, function as speakers. And, as such, the speakers may also be beamformed to particular locations including toward the user's ears.

The microphones 103A-103C may be linked to a processor via a flexible cable 104 or via some other type of electrical connection. The processor may be a generic processor, or may be a specific-purpose processor, such as a programmable logic device (PLD), system on a chip (SOC), electrically erasable programmable read-only memory (EEPROM), or other similar type of processor. The processor (not shown) may be configured to receive and process electrical signals detected by the microphones 103A-103C. The processor may also be configured to receive and process data from various sensors including optical (image) sensors (e.g., cameras, infrared sensors, etc.), accelerometers, inertial motion units (IMUs), etc., as well as global positioning system (GPS) radios, WiFi radios, or other location tracking components.

In some embodiments, the HMD 100 may include an optical window or other optical structure 102 through which the various sensors operate. At least in some cases, the optical structure 102 may be transparent to visible or non-visible light. The optical structure 102 may be both a cosmetic piece and a functional component of the HMD 100. For example, the optical structure may be cosmetic in that it may provide a curvature and an outer lining to the HMD 100. The optical structure 102 may also be functional in that it shields the image sensors (and other sensors) from the external environment, and further allows a place for the head-mounted device 100 to rest on the user's nose, thereby providing stability and steadiness while wearing the HMD.

The HMD 100 may also include other components including a lower housing 105. The lower housing 105 may similarly be both cosmetic and functional, shielding the HMD's internal components and providing an external curvature to fit around a user's face. The HMD 100 may further include an outer covering 101 that covers the exterior portion of the HMD opposite the user's eyes. The outer covering 101 may be opaque in the case of virtual reality devices, and may be transparent or semitransparent in cases of augmented reality devices. In order to cool the various electronic components of the HMD 100, the HMD may include one or more active cooling components, including fans. These fans may blow directly or indirectly on different components (e.g., sensors or processors) that tend to generate heat during operation. In some embodiments, the HMD 100 may include channels that guide the air that is blown by the fans. As such, the fans may blow the air within the HMD 100, and that air may exit the channels through one or more air outlets 107. These air outlets 107 may comprise openings in the HMD 100 between the outer covering 101 and the optical structure 102.

More specifically, the openings may comprise or may be created by gaps between the optical structure 102 and a vent bracket 106. The vent bracket may trace around at least a portion of the HMD's exterior, and may provide structural stability and protection to the internal components. The opening between the vent bracket 106 and the optical structure 102 may allow sounds (e.g., from the user's mouth) to reach the microphones 103A-103C. By placing the microphones 103A-103C in recessed areas that are open to external sounds via the openings between the vent bracket 106 and the optical structure 102, the embodiments herein may implement microphones in the HMD 100 without needing to drill holes in the optical structure 102. This may also allow more freedom in placing (image detecting) sensors within the optical structure. Still further, placing the microphones 103A-103C within these openings or recessed areas may allow the HMD 100 to be sound tested for leakage while at the sub-assembly level, instead of at a full assembly level. This may allow for more accurate and more reliable sound leakage tests of the HMD 100, and may allow those tests to occur earlier in the manufacturing process.

Figure 2:
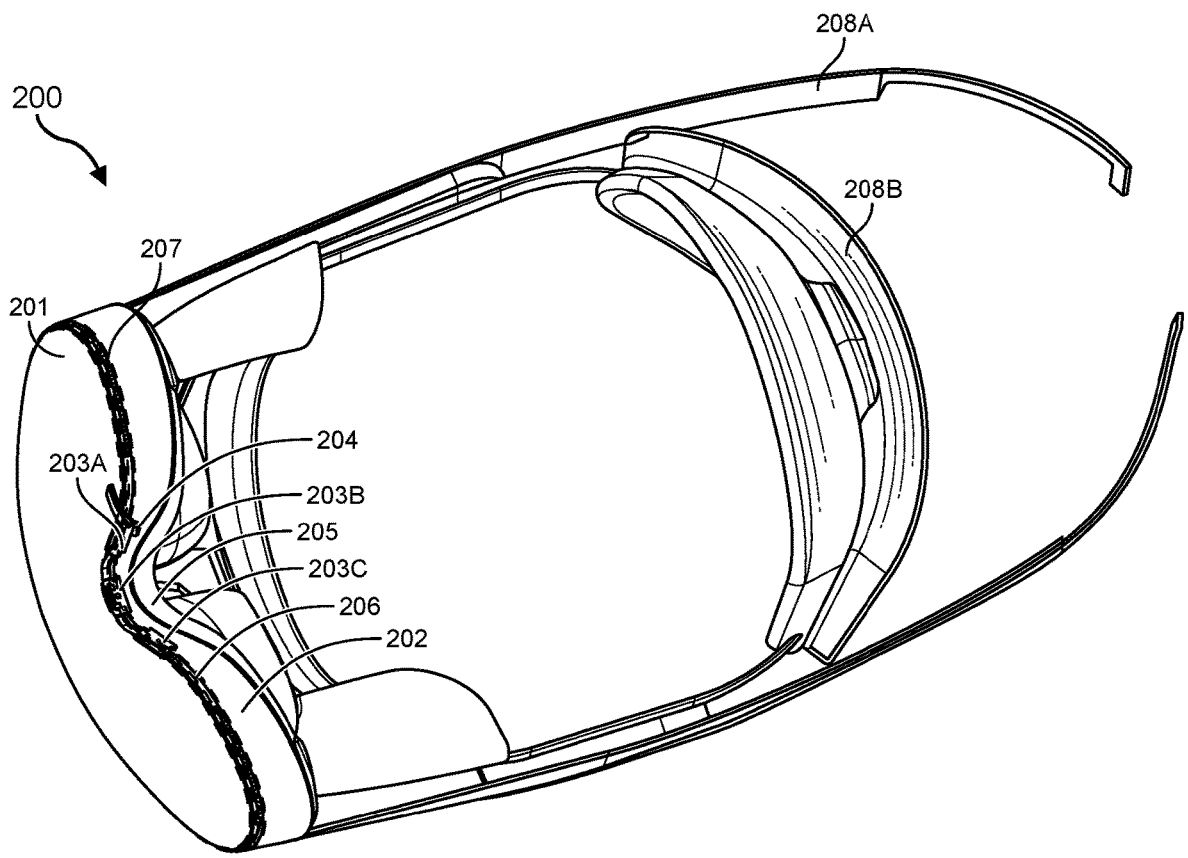
FIG. 2 illustrates an alternative example embodiment of a head mounted display that includes an array of microphones embedded in a groove.

FIG. 2 illustrates an embodiment of a same or similar head-mounted device 200 to the HMD 100 of FIG. 1. The HMD 200 may include an outer covering 201 and an optical structure 202. The outer covering 201 may be attached to the optical structure 202 through a vent bracket 206. In at least some places, the vent bracket 206 may include multiple non-contiguous regions or openings through which the microphones 203A-203C may be exposed to the external environment. The HMD 200 may also include vent holes 207 that may allow air to flow out of the HMD. The optical structure 202 may also be attached to (e.g., bonded to or molded to) a lower housing 205. The lower housing 205 and the optical structure 202 may, as a combined unit, rest on the HMD user's nose. The HMD 200 may also attach to the user via attachment components 208A and/or 208B that wrap around the user's head and rest on the back of the user's head. These attachment components 208A/208B may function to secure the HMD 200 to the user's head, and may allow the user to move their head freely while wearing the HMD.

Figure 3:
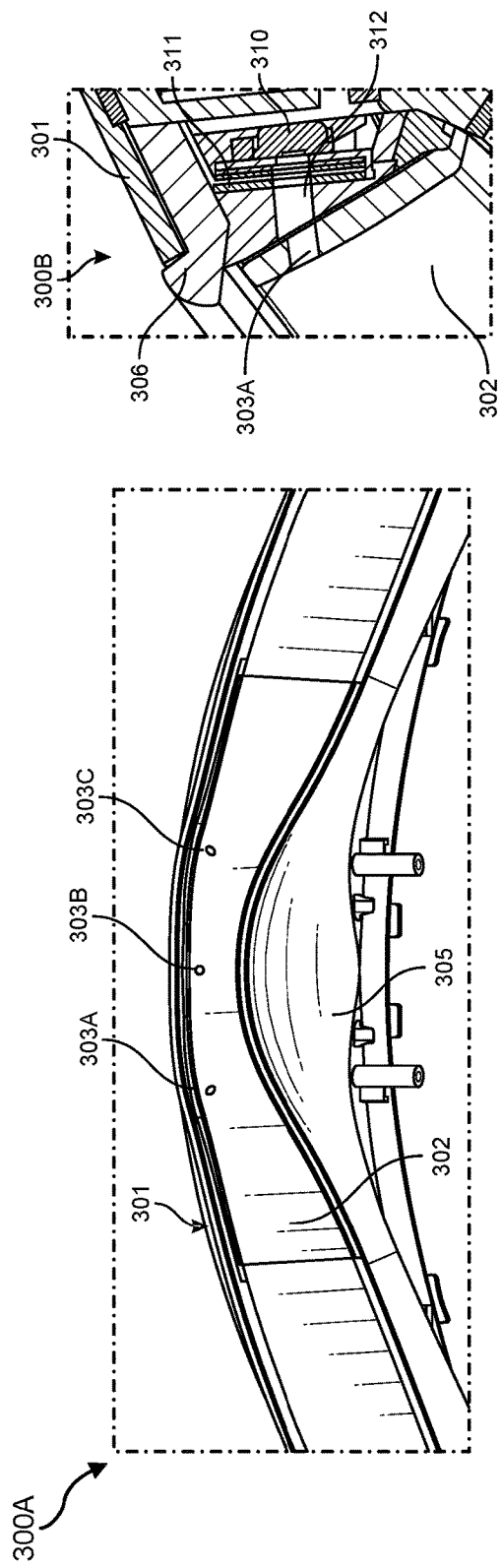
FIG. 3 illustrates an embodiment of an electronic device having an array of microphones distributed behind ports.

FIG. 3 illustrates a first design 300A that includes audio ports 303A, 303B, and 303C. These ports may align with corresponding microphones (e.g., microphone 310 of embodiment 300B). The ports 303A-303C may be drilled into the optical structure 302, which lies between an outer covering 301 and a lower housing 305. In this embodiment, there may be no gap between the vent bracket 306 and the optical structure 302. The microphone 310 may receive auditory tones (e.g., voice signals) from the external environment via the drilled ports (e.g., 303A). The inner support structure 312 may also have a hole drilled in it to complete the port to the external environment. In some embodiments, various layers of foam and mesh 311 may be implemented to aid the microphone in detecting audible tones. As noted above, in this first design 300A/300B, the holes in the optical structure 302 and/or in the inner support structure 312 may limit where image sensors may be placed within the optical structure. Moreover, these ports 303A-303C may be occluded by the user's nose when the HMD is worn by a user.

Figure 4:
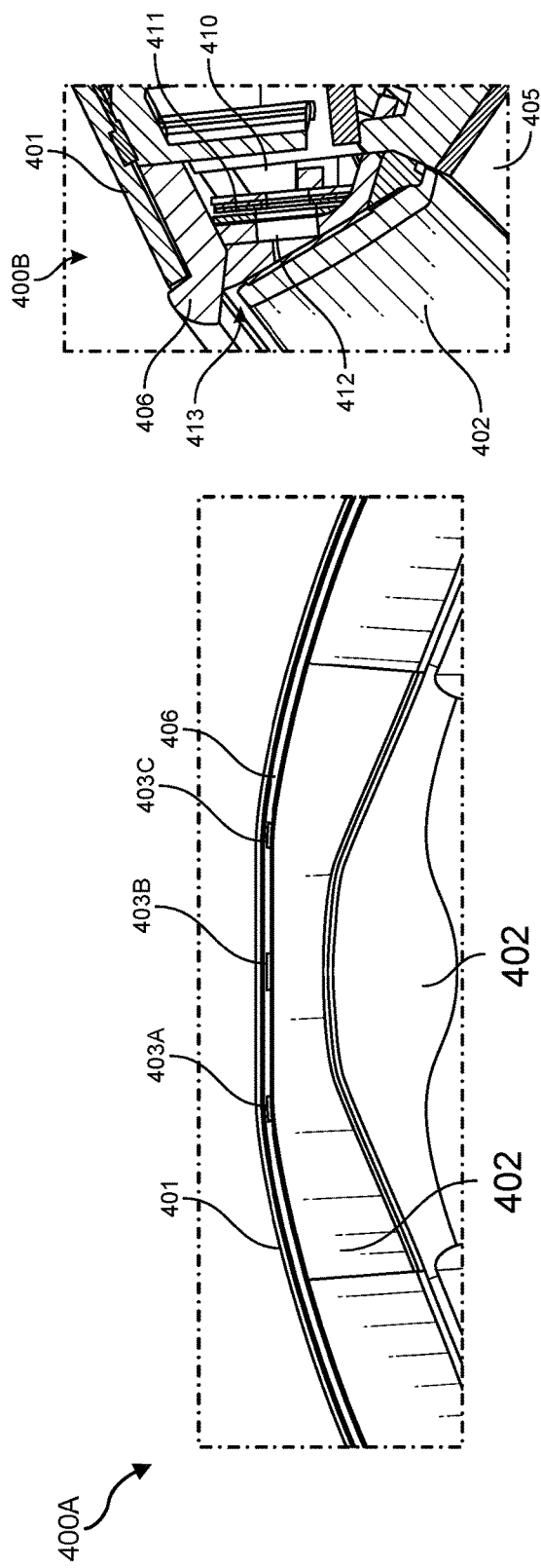
FIG. 4 illustrates an embodiment of an electronic device having an array of microphones embedded within a groove.

FIG. 4 illustrates a second design 400A in which the microphone ports 403A, 403B, and 403C may be recessed, and may be located in a groove between the vent bracket 406 and the optical structure 402. As shown in embodiment 400B, the vent bracket 406 may positioned or may be formed to allow a gap or opening between the vent bracket 406 and the optical structure 402. In this design, because the microphones and the corresponding microphone ports 403A-403C are recessed in a groove, the optical structure 402 does not need to have any port holes drilled into it, allowing for more flexibility in where image sensors are placed. Moreover, because the microphones and the corresponding microphone ports 403A-403C are recessed in a groove, the user's nose is much less likely to occlude or prevent audible sounds from reaching the microphones. The microphone 410 may receive audible signals through an opening 413. This opening may continue through the inner support structure 412 and through any layers of sealing foam and/or mesh 411. Within this second design, the opening 413 created between the vent bracket 406 and the optical structure 402 may be sandwiched by the outer covering 401 and the lower housing 405, each of which may provide structural and cosmetic features to the HMD. FIGS. 5A-8B illustrate additional embodiments and design variations related to the second design of embodiments 400A/400B.

Figure 5A:
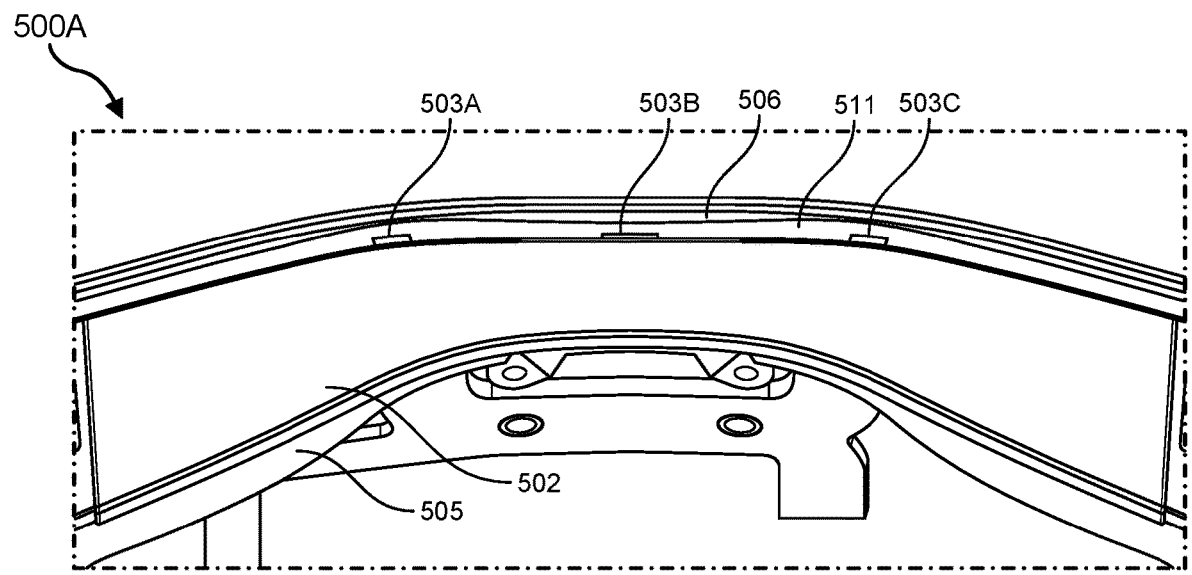
FIG. 5A illustrates an embodiment of an electronic device having an array of microphones distributed within a groove, and that further includes a vent bracket.

For example, FIG. 5A illustrates an embodiment 500A in which a vent bracket 506 sits atop an optical structure 502. In some cases, the vent bracket 506 may be permanently affixed to the optical structure 502 and, in other cases, the vent bracket 506 may be detachably affixed to the optical structure 502. The area between the vent bracket 506 and the optical structure 502 may form a groove 511 that wraps around at least a portion of the head-mounted device (or other type of electronic device). The groove 511 may include openings 503A, 503B, and/or 503C that allow external sounds to reach recessed microphones (e.g., microphones 510A, 510B, and/or 510C of embodiment 500B). The openings 503A-503C may be positioned away from a user's nose and, as such, may not occlude external sounds or prevent those sounds from reaching the microphones 510A-510C. Moreover, by positioning the openings 503A-503C within the groove between the vent bracket 506 and the optical structure 502, the embodiments 500A-500C may allow placement of image sensors substantially anywhere behind the optical structure. Still further, placing the openings 503A-503C within this groove 511 may allow audio tests to be performed on the HMD while at a subassembly level, which may lead to more accurate tests, and may alert designers to potential problems before the device is fully assembled.

Figure 5B:
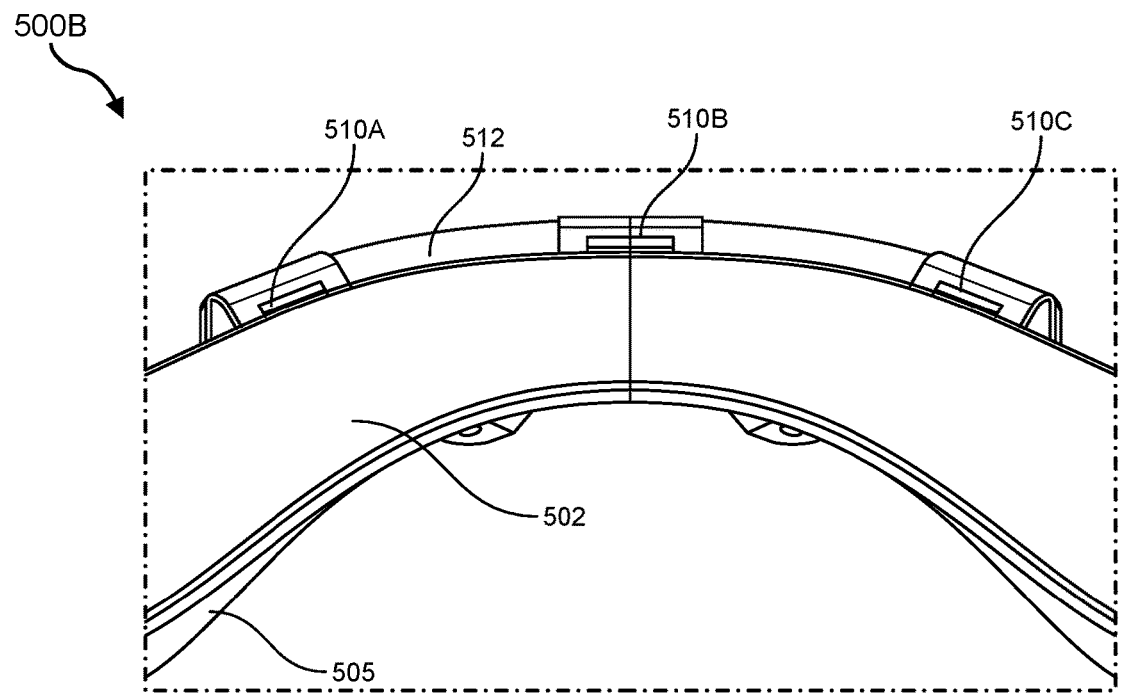
FIG. 5B illustrates an embodiment of an electronic device having an array of microphones distributed within a groove, without the vent bracket of FIG. 5A.
Figure 5C:
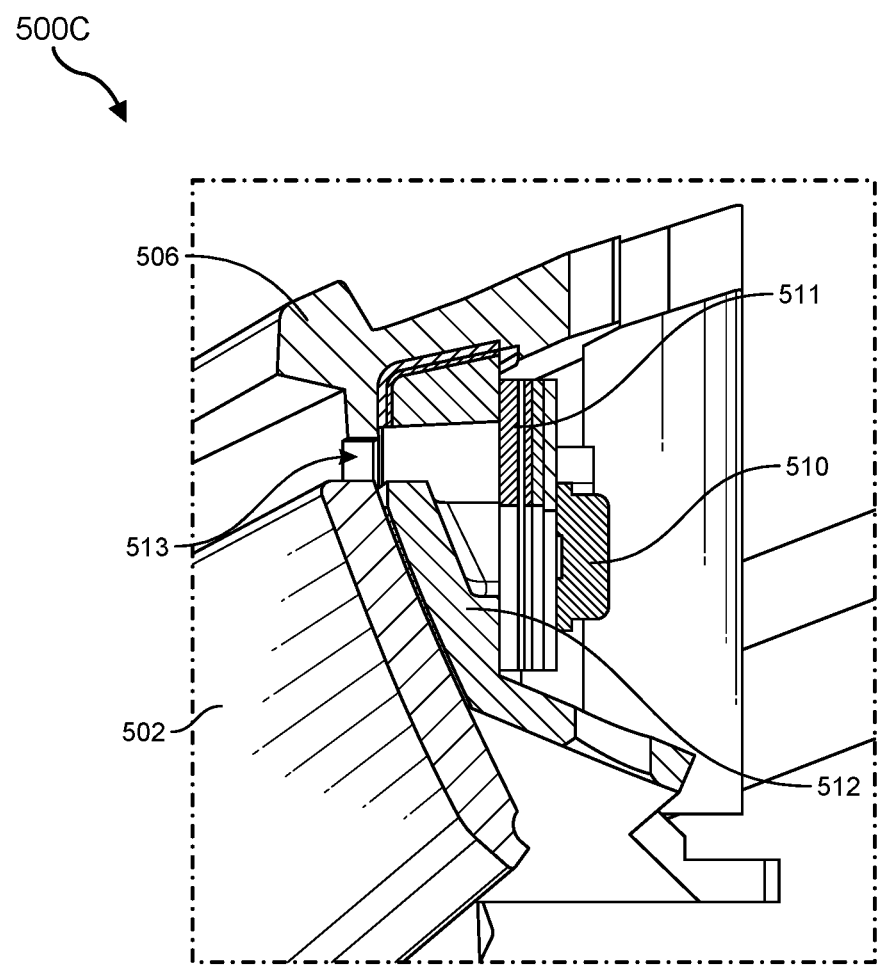
FIG. 5C illustrates a side view of an embodiment of an electronic device having an array of microphones distributed within a groove, including the vent bracket of FIG. 5A.

Embodiment 500B illustrates portions of the HMD without the vent bracket 506. Without the presence of the vent bracket 506, the inner support structure 512 may be visible. The inner support structure 512 may house the microphones 510A-510C, and may structurally support those microphones and other components to which they are linked. At least in some cases, the inner support structure 512 may be attached to the optical structure 502 and/or a lower housing 505. Embodiment 500C of FIG. 5C illustrates how external sounds may travel through the opening 513 that is created between the vent bracket 506 and the (transparent) optical structure 502. External sounds may travel through the opening 513, through the inner support structure 512, and through one or more layers of sealing foam or mesh to the microphone 510.

In one embodiment, an electronic device such as a head-mounted device may include, among other components, an optical structure (e.g., 502 in FIG. 5A). The optical structure may be transparent or semi-transparent and may house one or more optical sensors directed toward a user. The optical sensors may be face tracking sensors, motion tracking sensors, internet of things (IOT) tracking sensors, or other types of sensors. The sensors may be configured to gather data through at least one layer of the transparent optical structure 502. The electronic device of embodiment 500A may also include a vent bracket 506. The vent bracket 506 may be positioned between the optical structure 502 and an outer covering of the device (e.g., 401 of FIG. 4). The vent bracket 506 may be positioned to provide an opening 513 between the optical structure 502 and the vent bracket 506. This opening 513 may allow air to flow through the opening and may allow external sounds to reach one or more microphones 510A-510C positioned in recessed ports between the optical structure 502 and the vent bracket 506, as generally shown in FIG. 5B.

As noted above, in at least some embodiments, the microphones 510A-510C may be an array of two, three, or more beamforming microphones. The beamforming microphones may be electronically and/or physically steered in a specific direction. In some cases, this array of beamforming microphones may be steered in the direction of the user's mouth. In this manner, the beamforming microphones may better detect the sounds and/or words uttered by the user. In some cases, the microphones may have designated functions, including functioning as center channel microphones, left channel microphones, or right channel microphones. In each case, the respective microphones may be configured to pick up external sounds, including sounds coming from different directions and different angles. As shown in embodiment 500C of FIG. 5C, the microphone 510B may be positioned within a recessed port or opening 513. The recessed opening 513 may be part of a groove 511 in the device that extends along the length of at least a portion of the device between the optical structure 502 and the vent bracket 506.

In some cases, this groove 511 in the device may be an air-cooling groove that is configured to conduct air flow through at least a portion of the device. In such cases, the device may include one or more fans or other active cooling mechanisms (e.g., water cooling). In such cases, these fans may blow air through various channels to cool the underlying electronic components that heat up during use. In some cases, the cooling air blown by the fans may blow through the groove 511 and out to the external environment. In some cases, the opening 513 may extend through at least a portion of an inner support structure 512. The inner support structure, as shown in FIG. 5C, may be positioned between the microphone 510 and at least a portion of the vent bracket 506 and at least a portion of the optical structure 502. The inner support structure 512 may include an opening that corresponds to the opening 513 between the optical structure 502 and the vent bracket 506. This may allow air to flow between the microphone 510B and the external environment.

Figure 6A:
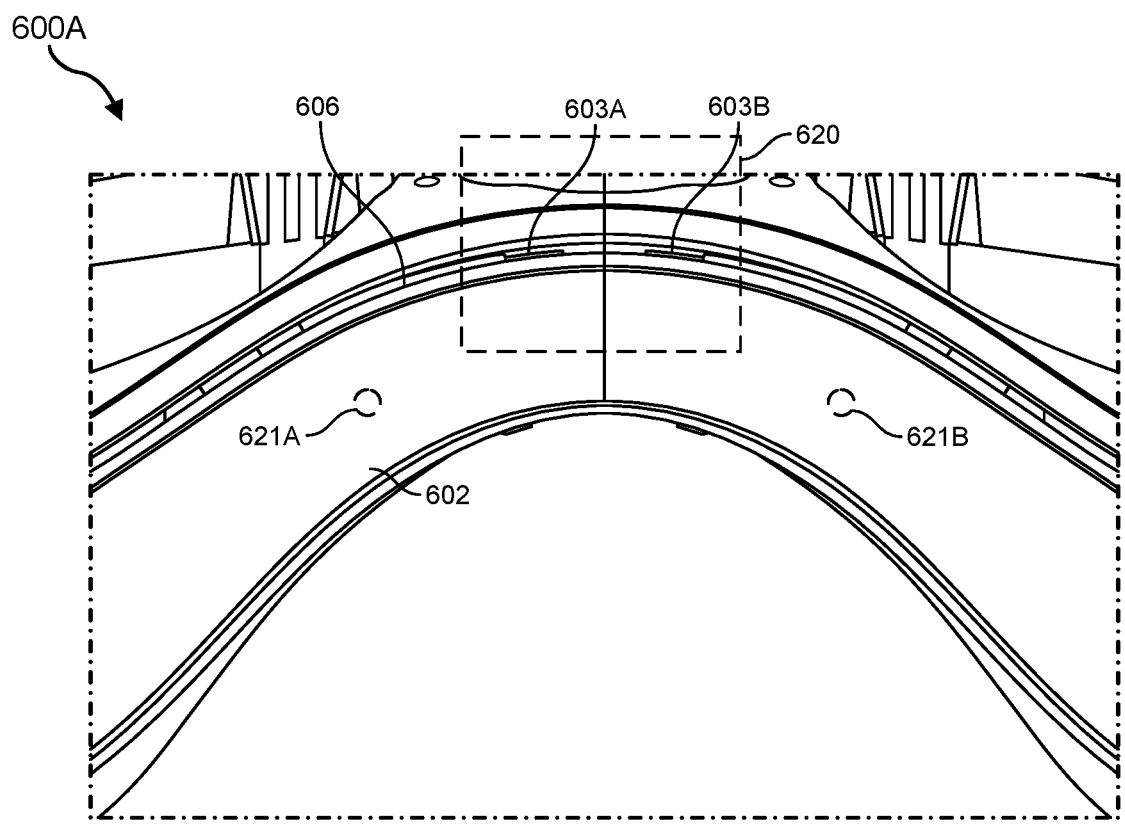
FIGS. 6A and 6B illustrate embodiments of an electronic device having an array of microphones distributed in a groove.
Figure 6B:
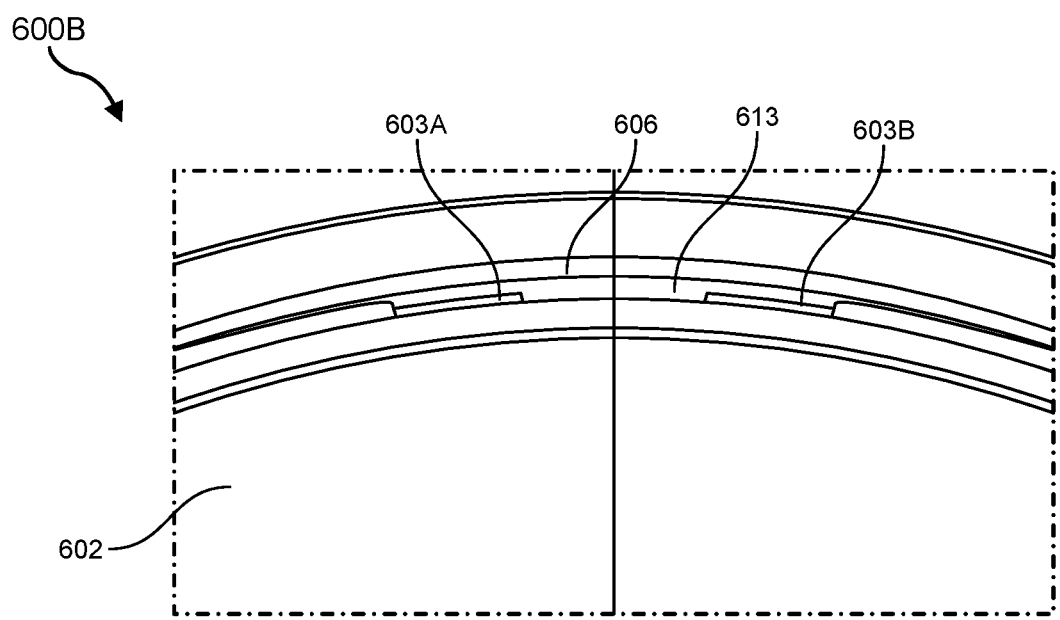

FIGS. 6A and 6B illustrate embodiments 600A/600B in which a dual-microphone system may be provided. The dual-microphone system may include two recessed ports 603A/603B for in-groove microphones. The recessed ports 603A/603B may lie between a vent bracket 606 and an optical structure 602. The dotted-line box 620 illustrates a zoomed-in region shown in FIG. 6B. As can be seen in the zoomed-in region of embodiment 600B, the recessed ports 603A and 603B may be cutouts or openings that lie between the vent bracket 606 and the optical structure 602. In some cases, these openings are part of an air circulation system that is designed to cool the electronic device (e.g., HMD 100 of FIG. 1). In other cases, the openings 603A/603B may be provided solely to lend external access to the recessed microphones (e.g., 510A-510C). The openings may allow the recessed microphones to beamform toward a user's mouth without being occluded by the user's nose. Moreover, by positioning the microphones in recessed ports, the optical sensors 621A and 621B may be positioned substantially anywhere along the optical structure 602.

Figure 7A:
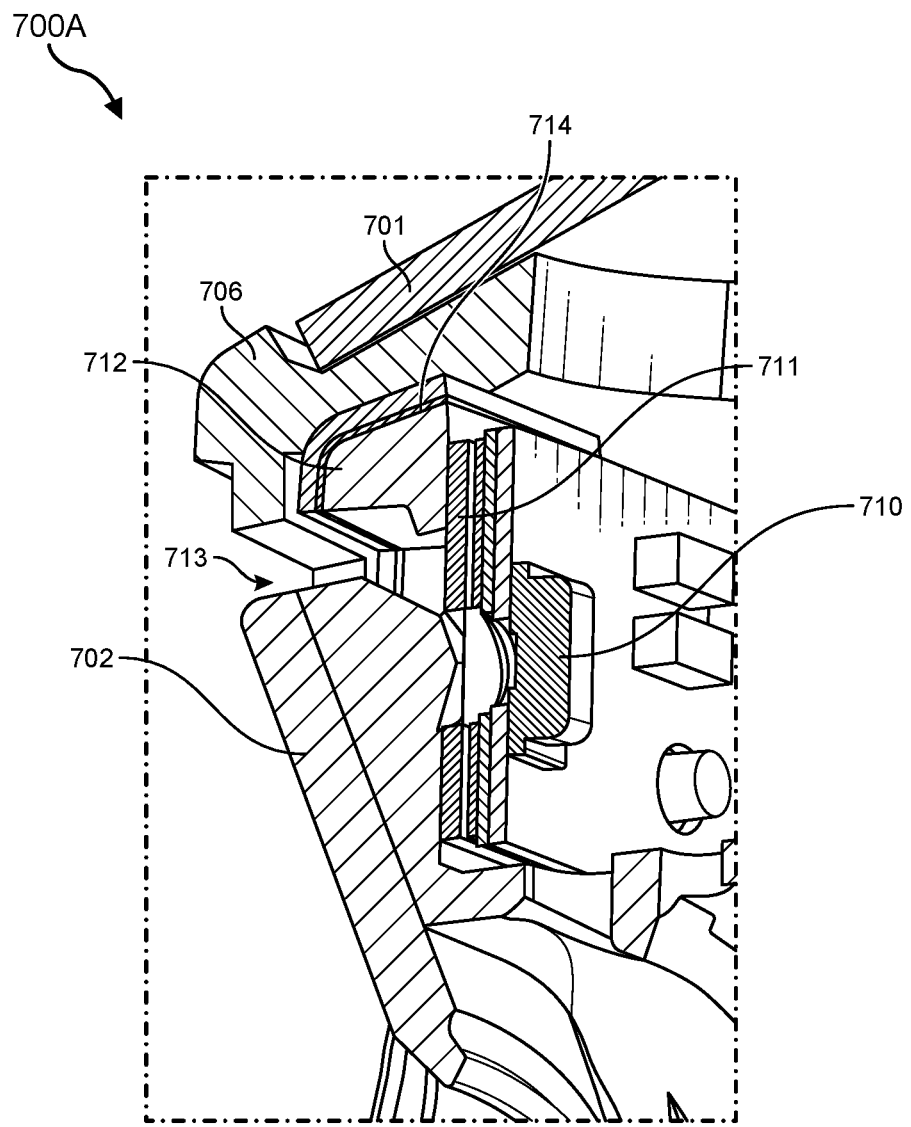
FIG. 7A illustrates an embodiment of an electronic device having a center channel microphone embedded within a groove.

The microphones and their corresponding recessed ports may be assembled or installed in substantially any location on the electronic device. In some cases, as shown in FIG. 7A, the microphone 710 of embodiment 700A may be a center-channel microphone that is installed in the middle of the electronic device, immediately over the user's nose. As such, the optical structure 702 may have a more curved structure to accommodate the user's nose. As in the figures described above, the center channel microphone 710 may lie behind an opening 713 created by the vent bracket 706 (and the outer covering 701) and the optical structure 702. The opening may extend through the inner support structure 712 and through to various layers of sealing foam and mesh 711. In some cases, the inner support structure 712 may be affixed to the vent bracket using a layer of pressure sensitive adhesive (PSA) 714 or other type of adhesive.

Figure 7B:
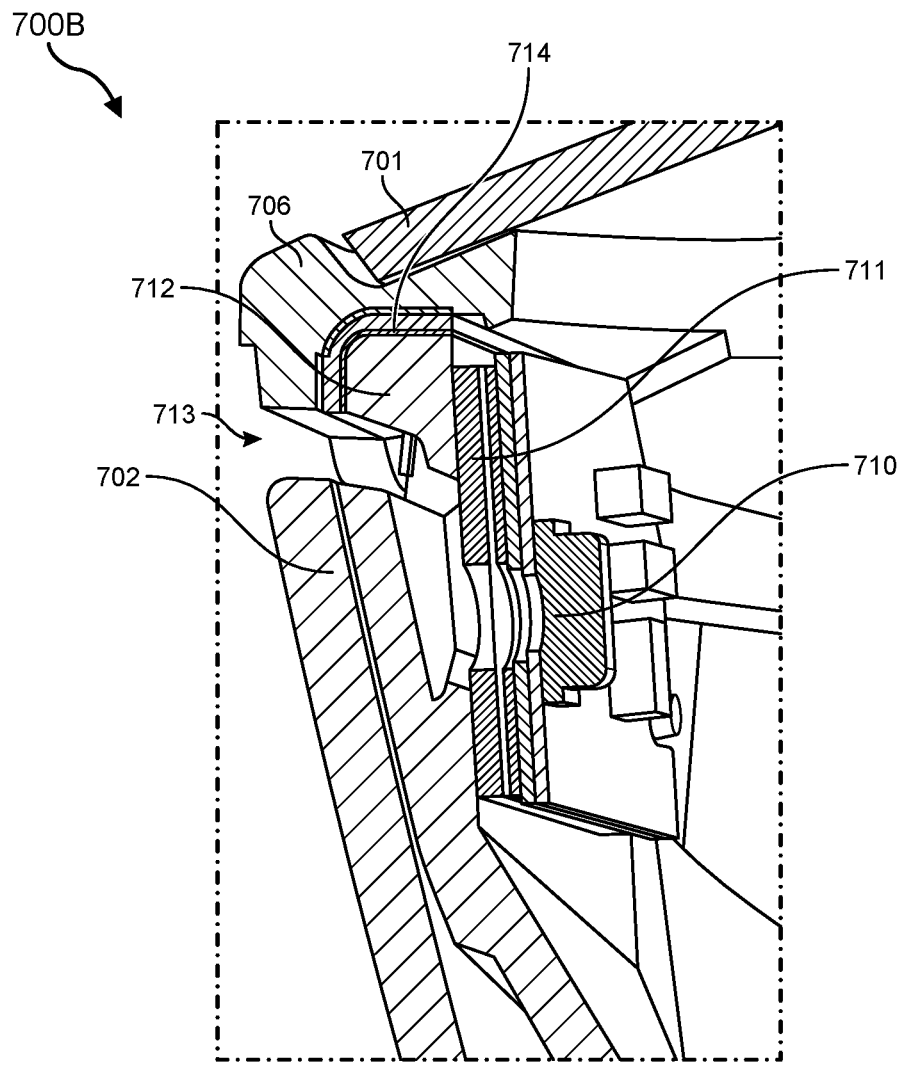
FIG. 7B illustrates an embodiment of an electronic device having a side channel microphone embedded within a groove.

The microphone 710 of embodiment 700B of FIG. 7B may be a side-channel microphone. As such, the side-channel microphone 710 may be positioned to either side of the center-channel microphone. The side-channel microphone may include some or all of the same components as the center-channel microphone of FIG. 7A. However, the optical structure beneath the side-channel microphone may be formed in an alternative manner to conform to the contours of the user's nose at the position of the side-channel microphone. In some cases, the electronic device may include additional portions of sealing foam (or other sealing material) to aid in providing a controlled auditory response that does not leak through other components.

Figure 8A:
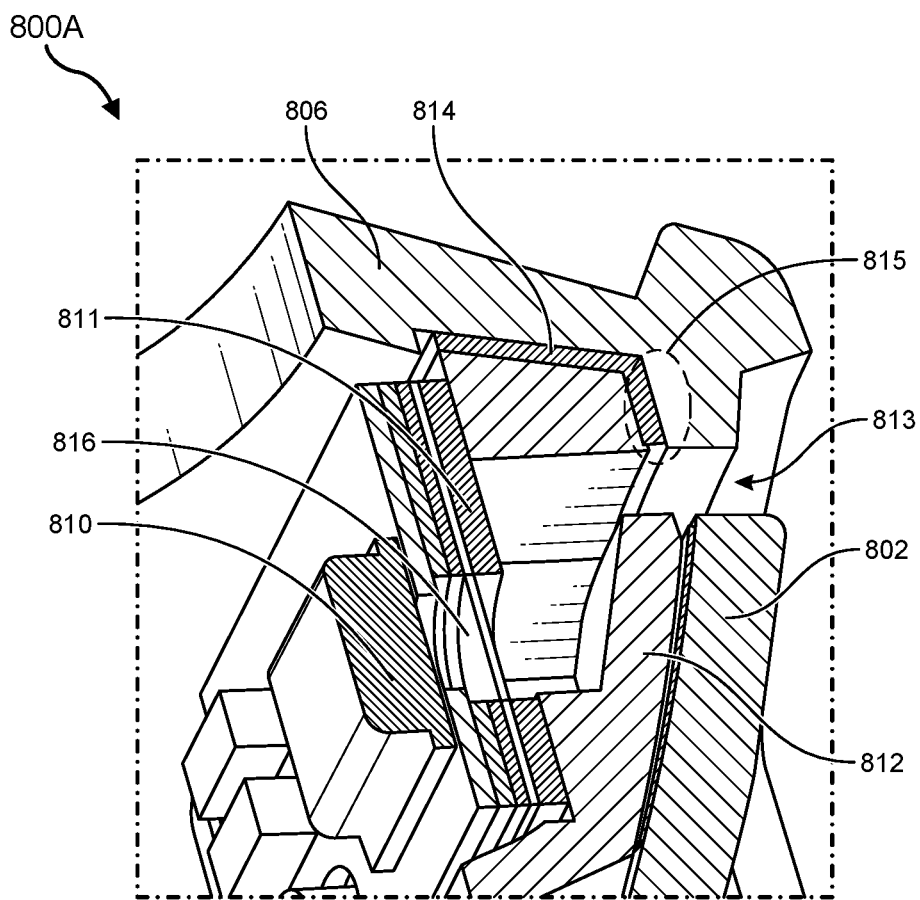
FIGS. 8A and 8B illustrate embodiments in which a sealing foam is inserted between a vent bracket and an inner support structure.
Figure 8B:
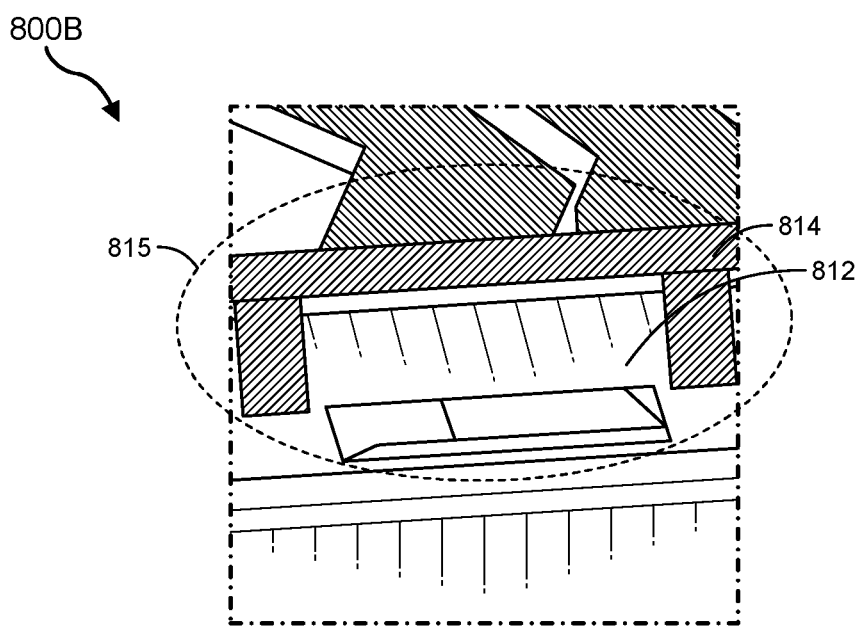

Indeed, as shown in embodiment 800A of FIG. 8A, a layer of sealing foam 814 may be positioned between the inner support structure 812 and the vent bracket 806. This may allow sounds to enter through the gap 813 between the vent bracket 806 and the optical structure 802, through the foam 811 and mesh 816, to the microphone 810. In some cases, the sealing foam 814 positioned between the vent bracket 806 and the inner support structure 812 may be U-shaped, as indicated by the zoomed-in area 815 shown in embodiment 800B of FIG. 8B. The sealing foam 814 may take the shape of a "U" to surround electronic components that may otherwise be prone to sound leakage. Sealing foam may also be inserted or implemented in other locations on the electronic device, especially surrounding the recessed microphones, to further insulate the sound and provide a more authentic and immersive experience for the user.

Figure 9:
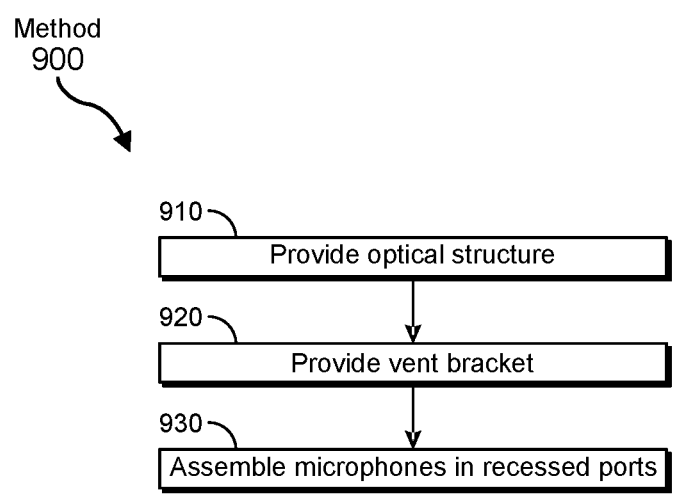
FIG. 9 is a flow diagram of an exemplary method of manufacturing an electronic device having recessed audio ports.

FIG. 9 is a flow diagram of an exemplary computer-implemented method 900 for manufacturing an electronic device. The steps shown in FIG. 9 may be performed by any suitable computer-executable code and/or computing system, including the systems illustrated herein, as well as any suitable piece or combination of manufacturing equipment. In one example, each of the steps shown in FIG. 9 may represent an algorithm whose structure includes and/or is represented by multiple sub-steps, examples of which will be provided in greater detail below.

As illustrated in FIG. 9, at step 910 one or more of the systems described herein may provide an optical structure (e.g., 602 of FIG. 6A) configured to house one or more optical sensors 621A directed toward a user. The sensors 621A/621B may be configured to gather data through at least one layer of the optical structure 602. Next, at step 920, the method 900 may include providing a vent bracket 606 positioned between the optical structure 602 and an outer covering of the device (e.g., 101 of FIG. 1). As noted above, the vent bracket 606 may be positioned to provide an opening (e.g., 603A or 603B of FIG. 6B) between the optical structure 602 and the vent bracket 606. These openings may allow air to flow through the device and out through the openings. Step 930 may then include assembling one or more microphones (e.g., 510 of FIG. 5C) in recessed ports 603A/603B between the optical structure 602 and the vent bracket 606. These recessed ports may allow external sounds (e.g., speech by the user) to reach the microphones and be processed by the system's microprocessor(s).

In some embodiments, the sensors 621A/621B may be face-tracking sensors. These face-tracking sensors may be positioned, placed, or otherwise provided behind the optical structure 602 to obtain face tracking data through the optical structure. The face tracking data may indicate when and how much the user's lips are moving, whether their chin is moving, and potentially whether their arms, shoulders, legs, or other items (e.g., controllers) are moving. In some cases, the method 900 may further include assembling an inner support structure (e.g., 712 of FIG. 7A) positioned between the microphone 710 and at least a portion of the vent bracket 706 and at least a portion of the optical structure 702. The inner support structure 712 may provide a channel or opening through which the microphone 710 is exposed to external sounds. This channel may also be used to route air blown by a fan from inside the device to the external environment.

In some cases, the method of manufacturing may further include performing a seal test for the microphones prior. The seal test may involve blocking the recessed microphone port and detecting how much sound leaks out of the device. In some cases, the seal test may be performed prior to assembling the vent bracket 706 or the optical structure 702. Performing the seal test at this partial assembly level may allow product designers or other users determine how well the recessed microphone port is sealed without fully assembling the device. Moreover, because the microphone port and the sealing foam are in open space, the seal test is generally easier to implement and is more reliable. For example, because the microphone port and the sealing foam are exposed to open space, auditory qualities including tone, pitch, and sound level may be tested, along with determining how much noise or sound obfuscation is present. Such an embodiment may also lead to more consistent seal tests, as there are no port holes drilled into the optical window out of which sound may leak.

In addition to the methods and devices described above, a corresponding system may also be provided. This system may include an optical structure configured to house one or more optical sensors directed toward a user, where the sensors are configured to gather data through at least one layer of the optical structure, a vent bracket positioned between the optical structure and an outer covering of the device, where the vent bracket is positioned to provide an opening between the optical structure and the vent bracket, allowing air to flow through the opening, and one or more microphones positioned in recessed ports between the optical structure and the vent bracket, where the openings allow external sounds to reach the microphones.

These systems, methods, and devices, as described herein, may provide embodiments that allow face-tracking sensors to be placed without limitation behind an optical structure. Moreover, these systems may avoid obfuscations of external sounds by placing the microphones in recessed ports that are much less likely to be blocked by a user's nose. Still further, the systems herein may allow for improved seams and seals, improved device cooling, and improved auditory testing on devices under test. Accordingly, these embodiments may provide multiple distinct improvements over other systems and devices.

EXAMPLE EMBODIMENTS

Example 1: A device may include an optical structure configured to house one or more sensors directed toward a user, the sensors being configured to gather data through at least one layer of the optical structure, a vent bracket positioned between the optical structure and an outer covering of the device, the vent bracket being positioned to provide an opening between the optical structure and the vent bracket, allowing air to flow through the opening, and one or more microphones positioned in recessed ports between the optical structure and the vent bracket, wherein the openings allow external sounds to reach the microphones.

Example 2: The device of Example 1, wherein the microphones comprise an array of two or more beamforming microphones.

Example 3: The device of Example 1 or Example 2, wherein the one or more microphones comprise a center channel microphone and at least one side channel microphone.

Example 4: The device of any of Examples 1-3, wherein the recessed ports are part of a groove in the device that extends along the length of at least a portion of the device between the optical structure and the vent bracket.

Example 5: The device of any of Examples 1-4, wherein the opening between the optical structure and the vent bracket is positioned within the groove in the device.

Example 6: The device of any of Examples 1-5, wherein the groove in the device comprises an air-cooling groove configured to conduct air flow through at least a portion of the device.

Example 7: The device of any of Examples 1-6, further comprising at least one fan configured to provide air cooling through the groove to one or more electrical components in the device.

Example 8: The device of any of Examples 1-7, wherein the optical structure is transparent, allowing one or more face-tracking sensors positioned behind the optical structure to obtain face tracking data through the optical structure.

Example 9: The device of any of Examples 1-8, further comprising a lower housing positioned between the microphones and at least a portion of the vent bracket and at least a portion of the optical structure.

Example 10: The device of any of Examples 1-9, wherein the lower housing includes an opening that corresponds to the opening between the optical structure and the vent bracket, allowing air to flow between the microphones and an external environment.

Example 11: The device of any of Examples 1-10, further comprising at least a portion of sealing foam that is positioned between the one or more microphones and the lower housing.

Example 12: The device of any of Examples 1-11, further comprising at least a portion of sealing foam that is positioned between the vent bracket and the lower housing.

Example 13: The device of any of Examples 1-12, wherein the device comprises a head-mounted artificial reality device.

Example 14: A method of manufacturing a device may include providing an optical structure configured to house one or more sensors directed toward a user, the sensors being configured to gather data through at least one layer of the optical structure, providing a vent bracket positioned between the optical structure and an outer covering of the device, the vent bracket being positioned to provide an opening between the optical structure and the vent bracket, allowing air to flow through the opening, and assembling one or more microphones in recessed ports between the optical structure and the vent bracket, wherein the openings allow external sounds to reach the microphones.

Example 15: The method of manufacturing of Example 14, further comprising assembling one or more face-tracking sensors behind the optical structure to obtain face tracking data through the optical structure.

Example 16: The method of manufacturing of Example 14 or Example 15, further comprising assembling at least one fan configured to provide air cooling through a groove in the device to one or more electrical components in the device.

Example 17: The method of manufacturing of any of Examples 14-16, further comprising assembling a lower housing positioned between the microphones and at least a portion of the vent bracket and at least a portion of the optical structure.

Example 18: The method of manufacturing of any of Examples 14-17, further comprising performing a seal test for the microphones prior to assembling the vent bracket or the optical structure.

Example 19: The method of manufacturing of any of claims 14-18, wherein the seal test is performed at a partial assembly level at which the device is partially assembled.

20. A system may include an optical structure configured to house one or more sensors directed toward a user, the sensors being configured to gather data through at least one layer of the optical structure, a vent bracket positioned between the optical structure and an outer covering of the device, the vent bracket being positioned to provide an opening between the optical structure and the vent bracket, allowing air to flow through the opening, and one or more microphones positioned in recessed ports between the optical structure and the vent bracket, wherein the openings allow external sounds to reach the microphones.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
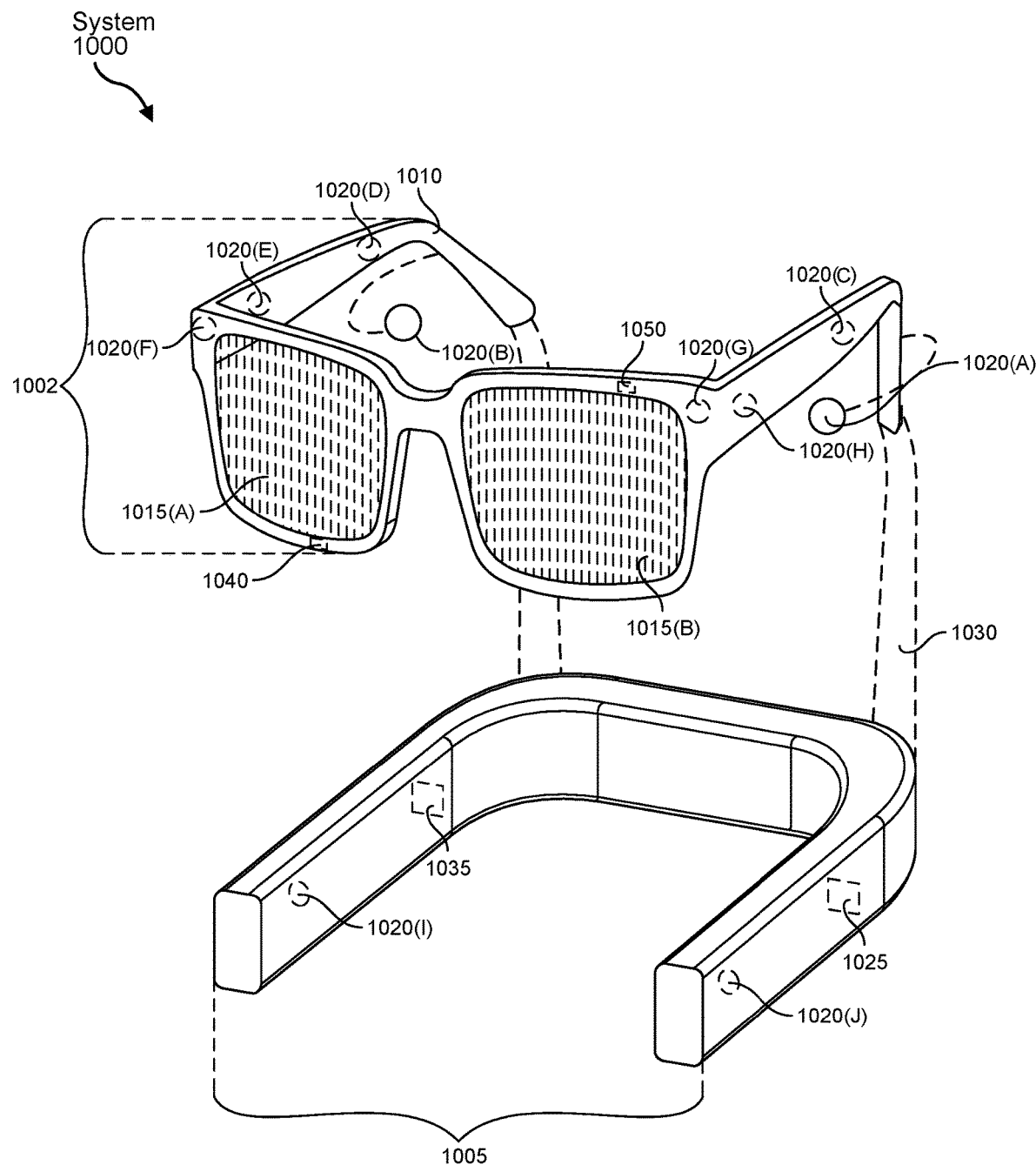
FIG. 10 is an illustration of exemplary augmented-reality glasses that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(1) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(1) and 1020(J) may be positioned on neckband 1005, thereby increasing the distance between the neckband acoustic transducers 1020(1) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1000 and 1100 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 12:
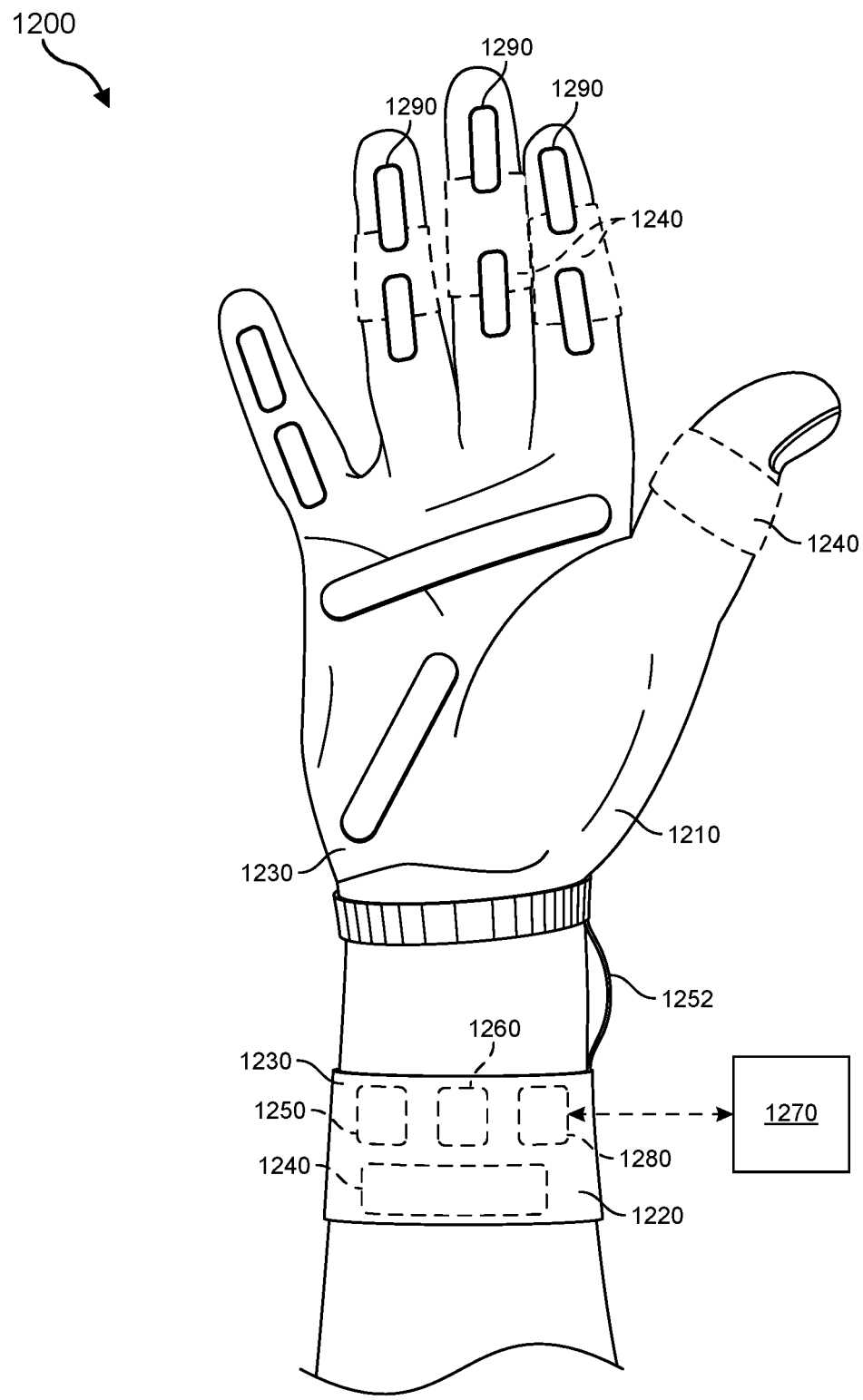
FIG. 12 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 12 illustrates a vibrotactile system 1200 in the form of a wearable glove (haptic device 1210) and wristband (haptic device 1220). Haptic device 1210 and haptic device 1220 are shown as examples of wearable devices that include a flexible, wearable textile material 1230 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1240 may be positioned at least partially within one or more corresponding pockets formed in textile material 1230 of vibrotactile system 1200. Vibrotactile devices 1240 may be positioned in locations to provide a vibrating sensation (e.g., haptic feedback) to a user of vibrotactile system 1200. For example, vibrotactile devices 1240 may be positioned against the user's finger(s), thumb, or wrist, as shown in FIG. 12. Vibrotactile devices 1240 may, in some examples, be sufficiently flexible to conform to or bend with the user's corresponding body part(s).

A power source 1250 (e.g., a battery) for applying a voltage to the vibrotactile devices 1240 for activation thereof may be electrically coupled to vibrotactile devices 1240, such as via conductive wiring 1252. In some examples, each of vibrotactile devices 1240 may be independently electrically coupled to power source 1250 for individual activation. In some embodiments, a processor 1260 may be operatively coupled to power source 1250 and configured (e.g., programmed) to control activation of vibrotactile devices 1240.

Vibrotactile system 1200 may be implemented in a variety of ways. In some examples, vibrotactile system 1200 may be a standalone system with integral subsystems and components for operation independent of other devices and systems. As another example, vibrotactile system 1200 may be configured for interaction with another device or system 1270. For example, vibrotactile system 1200 may, in some examples, include a communications interface 1280 for receiving and/or sending signals to the other device or system 1270. The other device or system 1270 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1280 may enable communications between vibrotactile system 1200 and the other device or system 1270 via a wireless (e.g., Wi-Fi, BLUETOOTH, cellular, radio, etc.) link or a wired link. If present, communications interface 1280 may be in communication with processor 1260, such as to provide a signal to processor 1260 to activate or deactivate one or more of the vibrotactile devices 1240.

Vibrotactile system 1200 may optionally include other subsystems and components, such as touch-sensitive pads 1290, pressure sensors, motion sensors, position sensors, lighting elements, and/or user interface elements (e.g., an on/off button, a vibration control element, etc.). During use, vibrotactile devices 1240 may be configured to be activated for a variety of different reasons, such as in response to the user's interaction with user interface elements, a signal from the motion or position sensors, a signal from the touch-sensitive pads 1290, a signal from the pressure sensors, a signal from the other device or system 1270, etc.

Although power source 1250, processor 1260, and communications interface 1280 are illustrated in FIG. 12 as being positioned in haptic device 1220, the present disclosure is not so limited. For example, one or more of power source 1250, processor 1260, or communications interface 1280 may be positioned within haptic device 1210 or within another wearable textile.

Figure 13:
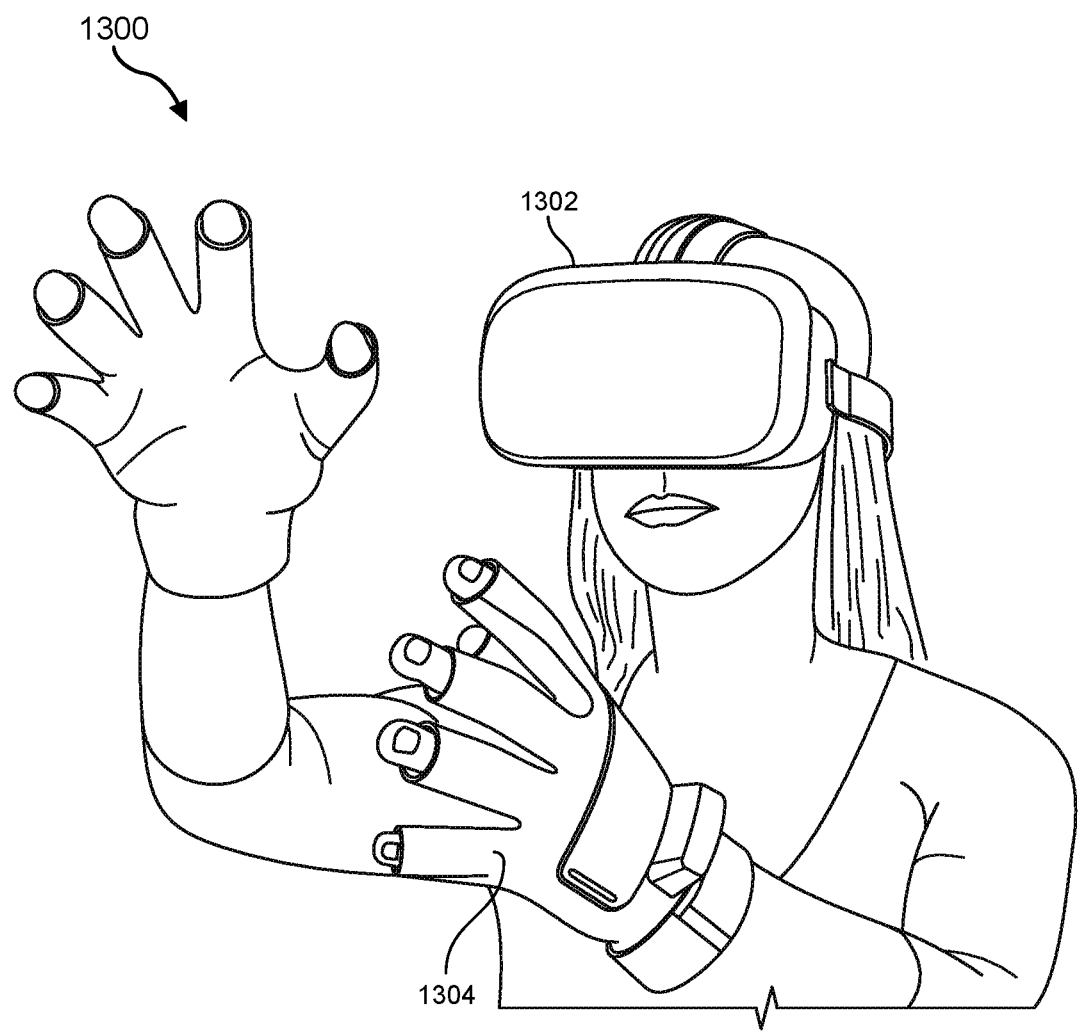
FIG. 13 is an illustration of an exemplary virtual-reality environment according to embodiments of this disclosure.

Haptic wearables, such as those shown in and described in connection with FIG. 12, may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 11:
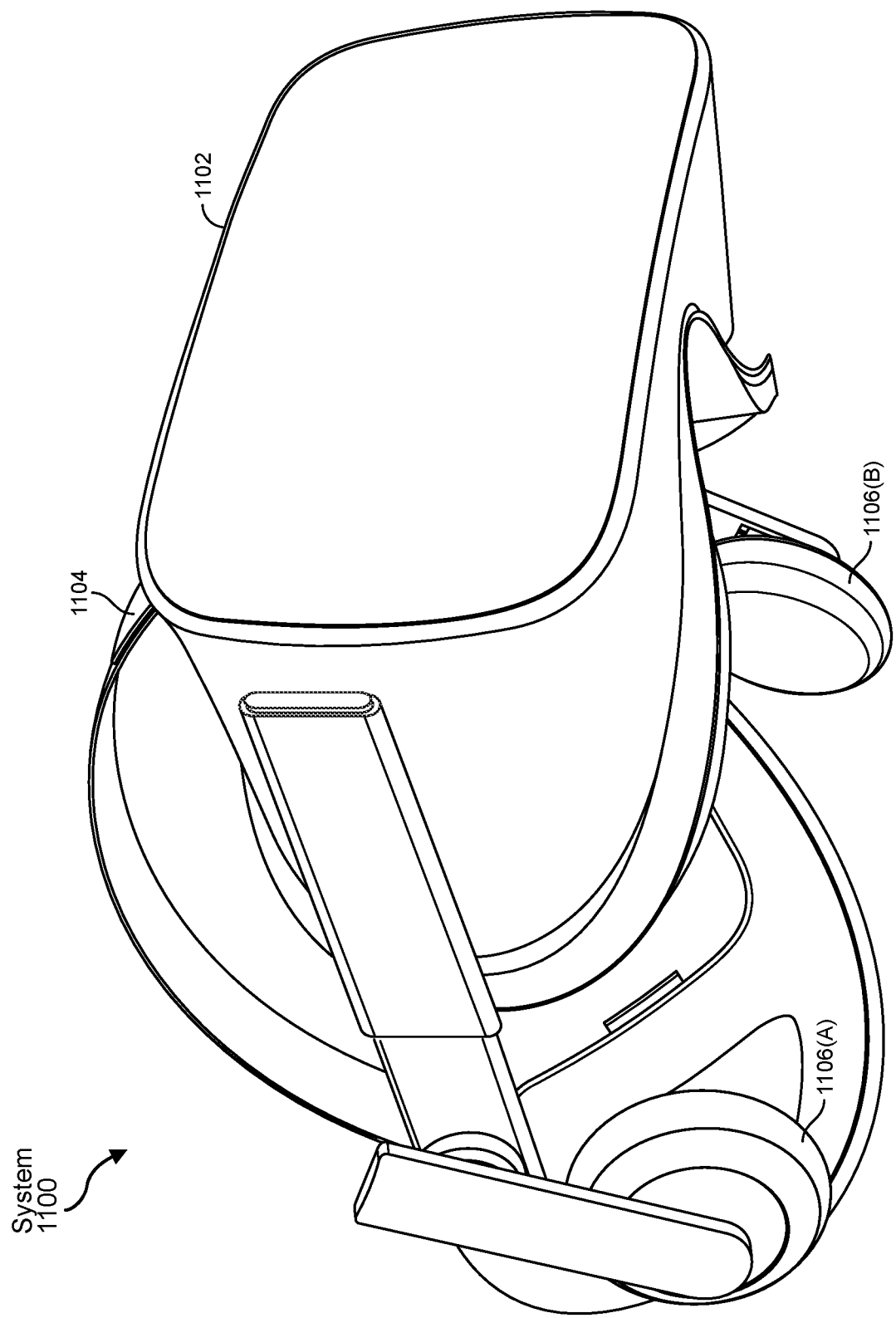
FIG. 11 is an illustration of an exemplary virtual-reality headset that may be used in connection with embodiments of this disclosure.

Head-mounted display 1302 generally represents any type or form of virtual-reality system, such as virtual-reality system 1100 in FIG. 11. Haptic device 1304 generally represents any type or form of wearable device, worn by a user of an artificial-reality system, that provides haptic feedback to the user to give the user the perception that he or she is physically engaging with a virtual object. In some embodiments, haptic device 1304 may provide haptic feedback by applying vibration, motion, and/or force to the user. For example, haptic device 1304 may limit or augment a user's movement. To give a specific example, haptic device 1304 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1304 to send action requests to a console. Examples of action requests include, without limitation, requests to start an application and/or end the application and/or requests to perform a particular action within the application.

Figure 14:
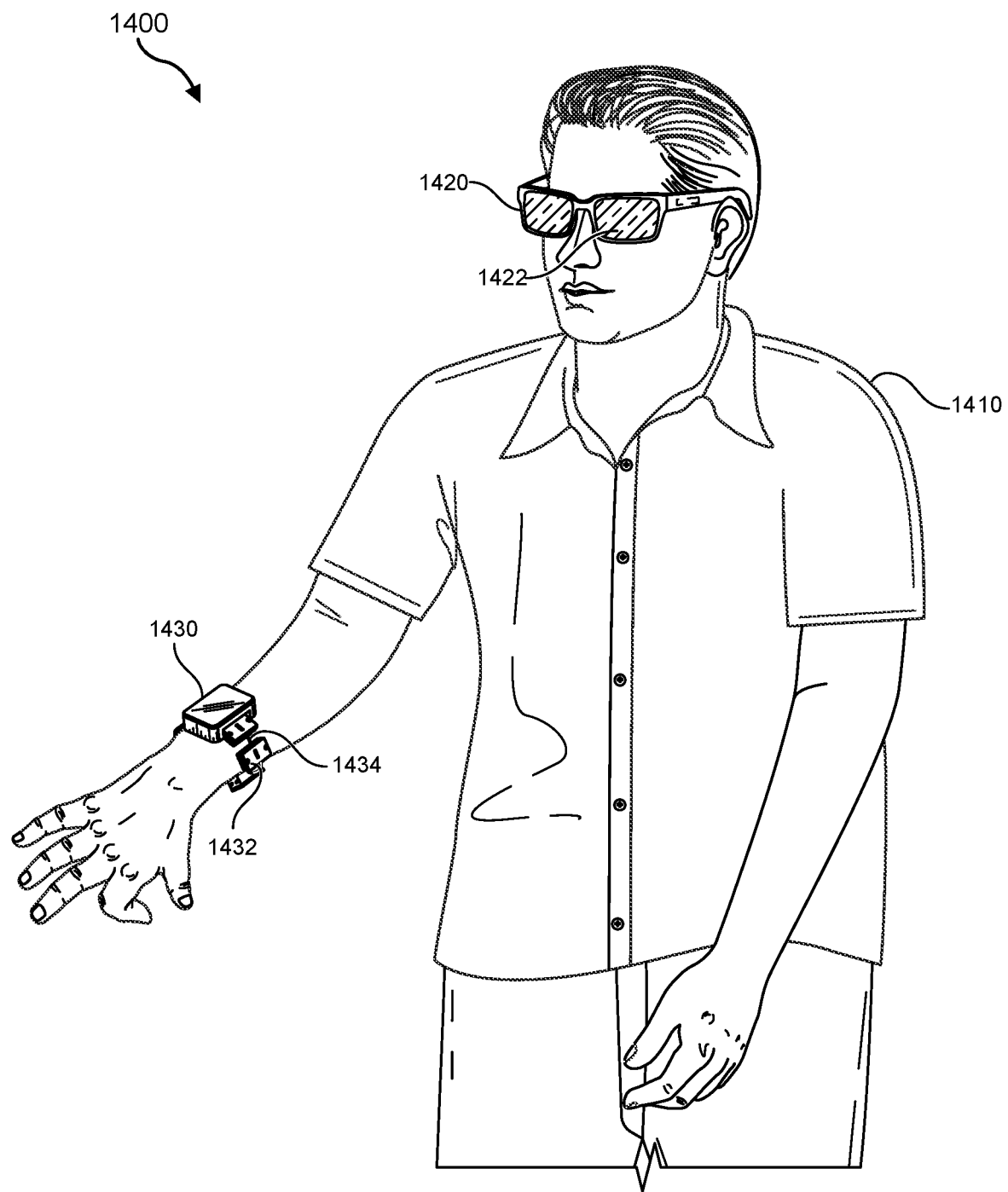
FIG. 14 is an illustration of an exemplary augmented-reality environment according to embodiments of this disclosure.

While haptic interfaces may be used with virtual-reality systems, as shown in FIG. 13, haptic interfaces may also be used with augmented-reality systems, as shown in FIG. 14. FIG. 14 is a perspective view of a user 1410 interacting with an augmented-reality system 1400. In this example, user 1410 may wear a pair of augmented-reality glasses 1420 that may have one or more displays 1422 and that are paired with a haptic device 1430. In this example, haptic device 1430 may be a wristband that includes a plurality of band elements 1432 and a tensioning mechanism 1434 that connects band elements 1432 to one another.

One or more of band elements 1432 may include any type or form of actuator suitable for providing haptic feedback. For example, one or more of band elements 1432 may be configured to provide one or more of various types of cutaneous feedback, including vibration, force, traction, texture, and/or temperature. To provide such feedback, band elements 1432 may include one or more of various types of actuators. In one example, each of band elements 1432 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1210, 1220, 1304, and 1430 may include any suitable number and/or type of haptic transducer, sensor, and/or feedback mechanism. For example, haptic devices 1210, 1220, 1304, and 1430 may include one or more mechanical transducers, piezoelectric transducers, and/or fluidic transducers. Haptic devices 1210, 1220, 1304, and 1430 may also include various combinations of different types and forms of transducers that work together or independently to enhance a user's artificial-reality experience. In one example, each of band elements 1432 of haptic device 1430 may include a vibrotactor (e.g., a vibrotactile actuator) configured to vibrate in unison or independently to provide one or more of various types of haptic sensations to a user.

Figure 15A:
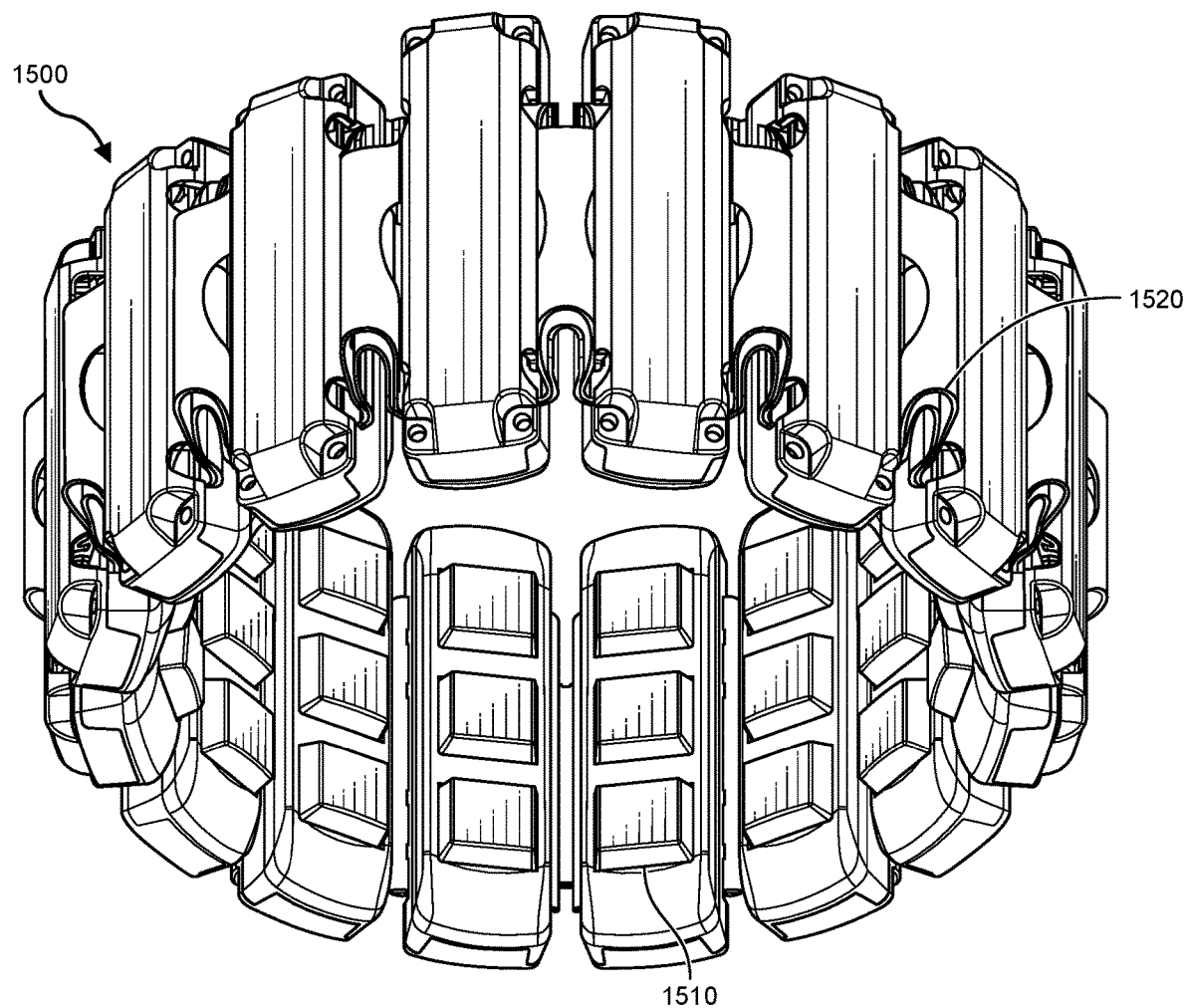
FIGS. 15A and 15B are illustrations of an exemplary human-machine interface configured to be worn around a user's lower arm or wrist.
Figure 15B:
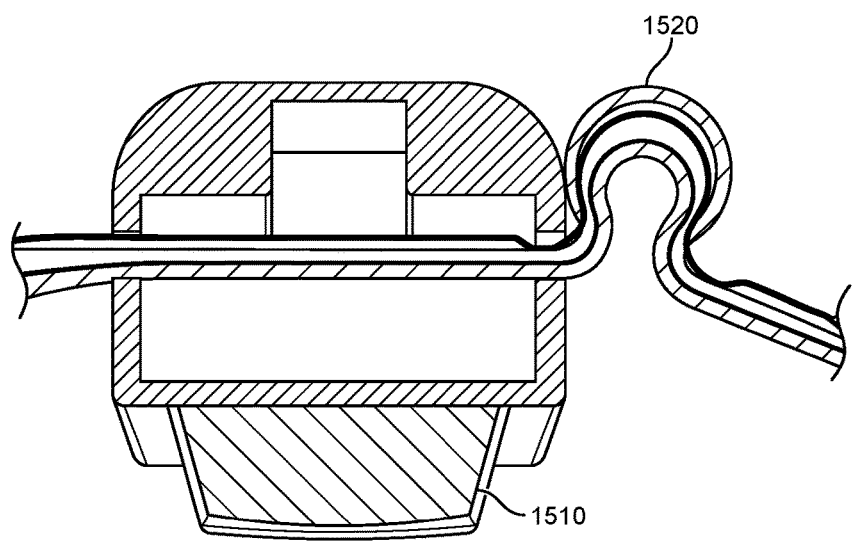

FIG. 15A illustrates an exemplary human-machine interface (also referred to herein as an EMG control interface) configured to be worn around a user's lower arm or wrist as a wearable system 1500. In this example, wearable system 1500 may include sixteen neuromuscular sensors 1510 (e.g., EMG sensors) arranged circumferentially around an elastic band 1520 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 15B illustrates a cross-sectional view through one of the sensors of the wearable device shown in FIG. 15A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1510 is discussed in more detail below with reference to FIGS. 16A and 16B.

Figure 16A:
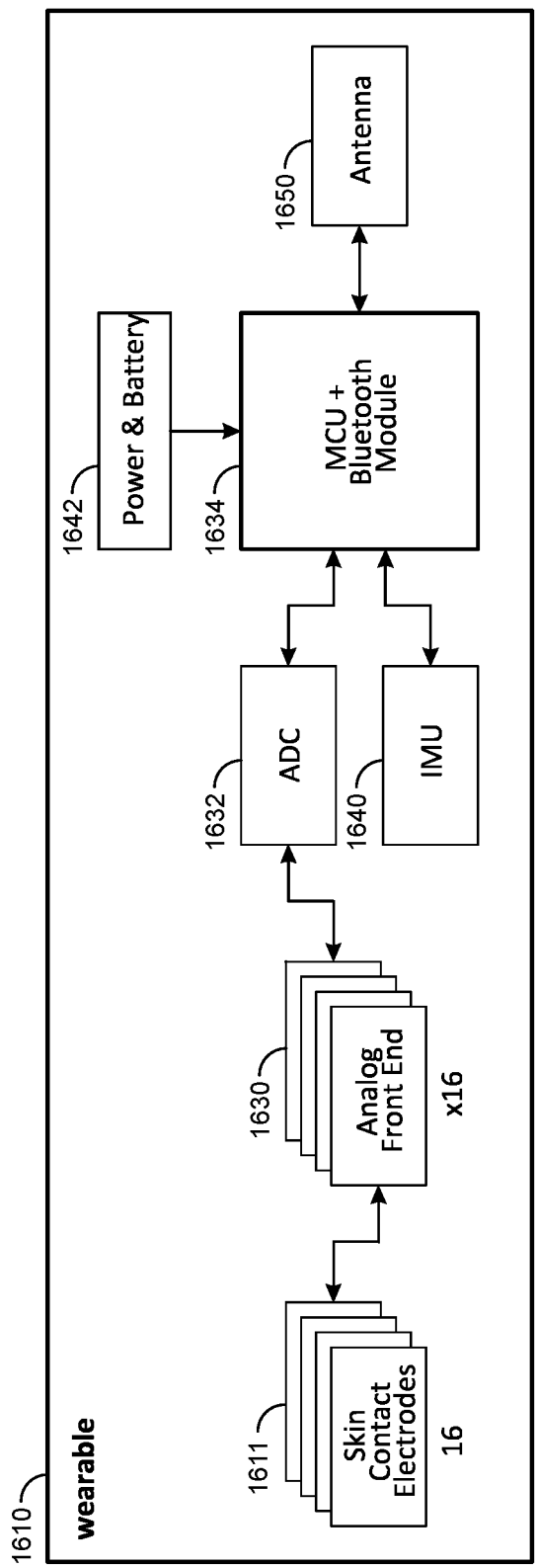
FIGS. 16A and 16B are illustrations of an exemplary schematic diagram with internal components of a wearable system.
Figure 16B:
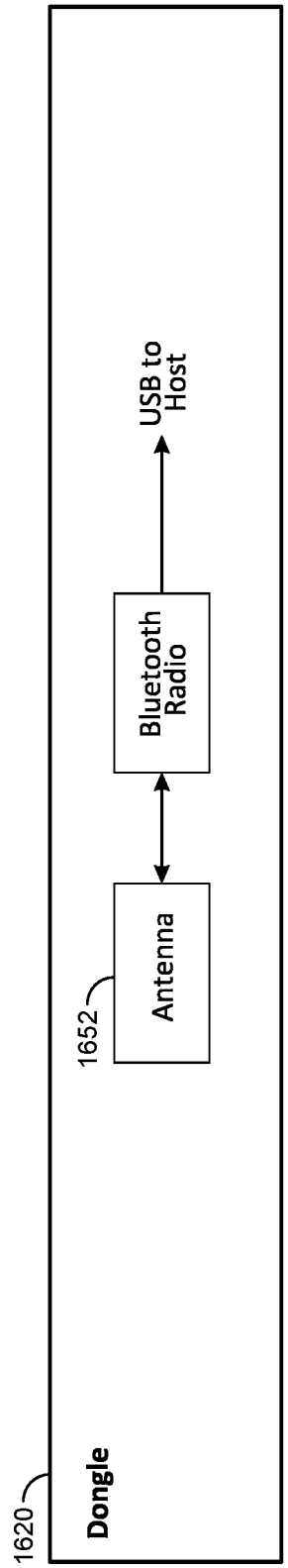

FIGS. 16A and 16B illustrate an exemplary schematic diagram with internal components of a wearable system with EMG sensors. As shown, the wearable system may include a wearable portion 1610 (FIG. 16A) and a dongle portion 1620 (FIG. 16B) in communication with the wearable portion 1610 (e.g., via BLUETOOTH or another suitable wireless communication technology). As shown in FIG. 16A, the wearable portion 1610 may include skin contact electrodes 1611, examples of which are described in connection with FIGS. 15A and 15B. The output of the skin contact electrodes 1611 may be provided to analog front end 1630, which may be configured to perform analog processing (e.g., amplification, noise reduction, filtering, etc.) on the recorded signals. The processed analog signals may then be provided to analog-to-digital converter 1632, which may convert the analog signals to digital signals that can be processed by one or more computer processors. An example of a computer processor that may be used in accordance with some embodiments is microcontroller (MCU) 1634, illustrated in FIG. 16A. As shown, MCU 1634 may also include inputs from other sensors (e.g., IMU sensor 1640), and power and battery module 1642. The output of the processing performed by MCU 1634 may be provided to antenna 1650 for transmission to dongle portion 1620 shown in FIG. 16B.

Dongle portion 1620 may include antenna 1652, which may be configured to communicate with antenna 1650 included as part of wearable portion 1610. Communication between antennas 1650 and 1652 may occur using any suitable wireless technology and protocol, non-limiting examples of which include radiofrequency signaling and BLUETOOTH. As shown, the signals received by antenna 1652 of dongle portion 1620 may be provided to a host computer for further processing, display, and/or for effecting control of a particular physical or virtual object or objects.

Although the examples provided with reference to FIGS. 15A-15B and FIGS. 16A-16B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   an optical structure configured to house one or more sensors directed toward a user, the sensors being configured to gather data through at least one layer of the optical structure;
   a vent bracket positioned between the optical structure and an outer covering of the device, the vent bracket being positioned to provide an opening between the optical structure and the vent bracket, allowing air to flow through the opening; and
   one or more microphones positioned in recessed ports between the optical structure and the vent bracket, wherein the openings allow external sounds to reach the microphones.

2. The device of claim 1, wherein the microphones comprise an array of two or more beamforming microphones.

3. The device of claim 1, wherein the one or more microphones comprise a center channel microphone and at least one side channel microphone.

4. The device of claim 1, wherein the recessed ports are part of a groove in the device that extends along the length of at least a portion of the device between the optical structure and the vent bracket.

5. The device of claim 4, wherein the opening between the optical structure and the vent bracket is positioned within the groove in the device.

6. The device of claim 4, wherein the groove in the device comprises an air-cooling groove configured to conduct air flow through at least a portion of the device.

7. The device of claim 6, further comprising at least one fan configured to provide air cooling through the groove to one or more electrical components in the device.

8. The device of claim 1, wherein the optical structure is transparent, allowing one or more face-tracking sensors positioned behind the optical structure to obtain face tracking data through the optical structure.

9. The device of claim 1, further comprising an inner support structure positioned between the microphones and at least a portion of the vent bracket and at least a portion of the optical structure.

10. The device of claim 9, wherein the inner support structure includes an opening that corresponds to the opening between the optical structure and the vent bracket, allowing air to flow between the microphones and an external environment.

11. The device of claim 10, further comprising at least a portion of sealing foam that is positioned between the one or more microphones and the inner support structure.

12. The device of claim 10, further comprising at least a portion of sealing foam that is positioned between the vent bracket and the inner support structure.

13. The device of claim 1, wherein the device comprises a head-mounted artificial reality device.

14. A method of manufacturing a device, comprising:
   providing an optical structure configured to house one or more sensors directed toward a user, the sensors being configured to gather data through at least one layer of the optical structure;
   providing a vent bracket positioned between the optical structure and an outer covering of the device, the vent bracket being positioned to provide an opening between the optical structure and the vent bracket, allowing air to flow through the opening; and assembling one or more microphones in recessed ports between the optical structure and the vent bracket, wherein the openings allow external sounds to reach the microphones.

15. The method of manufacturing of claim 14, further comprising assembling one or more face-tracking sensors behind the optical structure to obtain face tracking data through the optical structure.

16. The method of manufacturing of claim 14, further comprising assembling at least one fan configured to provide air cooling through a groove in the device to one or more electrical components in the device.

17. The method of manufacturing of claim 14, further comprising assembling an inner support structure positioned between the microphones and at least a portion of the vent bracket and at least a portion of the optical structure.

18. The method of manufacturing of claim 14, further comprising performing a seal test for the microphones prior to assembling the vent bracket or the optical structure.

19. The method of manufacturing of claim 18, wherein the seal test is performed at a partial assembly level at which the device is partially assembled.

20. A system comprising:
an optical structure configured to house one or more sensors directed toward a user, the sensors being configured to gather data through at least one layer of the optical structure;
a vent bracket positioned between the optical structure and an outer covering of the system, the vent bracket being positioned to provide an opening between the optical structure and the vent bracket, allowing air to flow through the opening; and
one or more microphones positioned in recessed ports between the optical structure and the vent bracket, wherein the openings allow external sounds to reach the microphones.

* * * * *